Jan. 26, 1954
O. H. SCHMITT ET AL
PLURAL MOTOR CONTROL SYSTEM FOR
USE WITH TRANSLATION DEVICES
Filed July 5, 1944
2,667,610
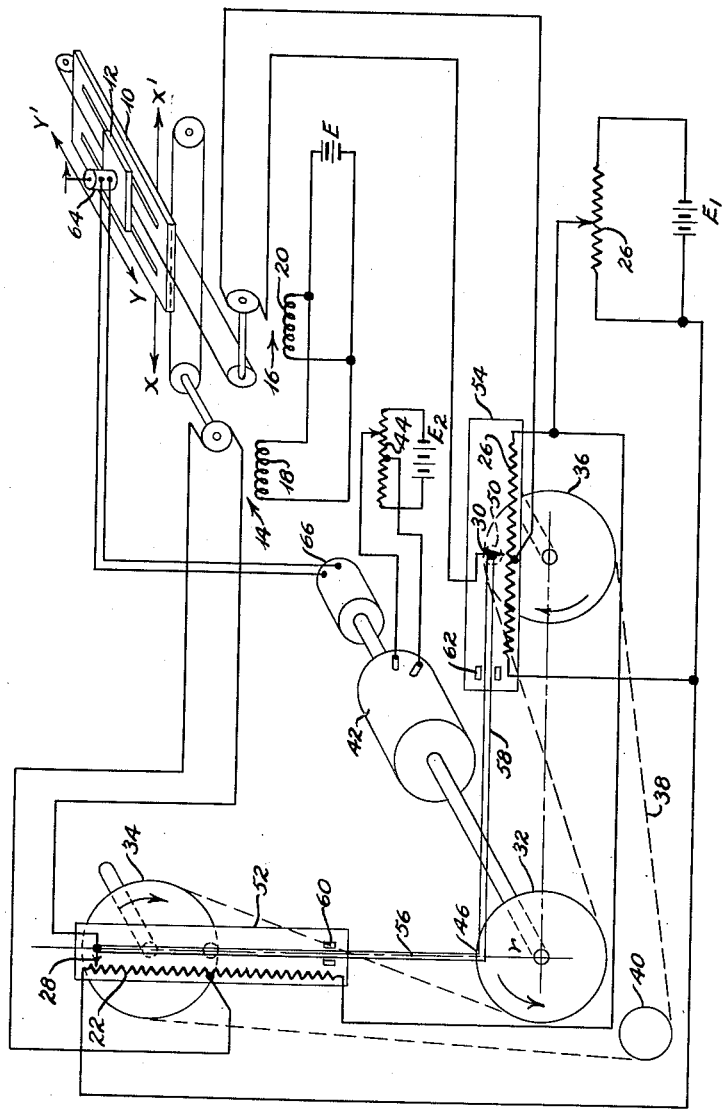
INVENTORS
*Otto H. Schmitt* and
*William B. Greenlee*
BY
*J. J. Schmitt*
*Walter S. Pawl,*
ATTORNEYS Patented Jan. 26, 1954

2,667,610

UNITED STATES PATENT OFFICE 2,667,610

PLURAL MOTOR CONTROL SYSTEM FOR USE WITH TRANSLATION DEVICES

Otto H. Schmitt, Port Washington, and William B. Greenlee, Garden City, N. Y.

Application July 5, 1944, Serial No. 543,592

2 Claims. (Cl. 318—55)

This invention relates to control systems, and more particularly to control systems for use with translation devices arranged to cause plane motion of a body along any desired path.

Plane motion of a body may be effected by means of a variety of translation systems arranged in general to cause two variations in the motion of the body, the result of which is to produce the desired motion. While the complexity of such translation systems may vary widely, one of the systems most commonly used is that which finds application in the ordinary bridge-type crane by means of which a body may be moved over any desired path to any point in a substantially rectangular area. This system comprises a beam long enough to bridge the width of the area to be covered and arranged for motion lengthwise of the area, and a carriage arranged to support the body and to move back and forth on the beam widthwise of the area. This type of translation system, which will hereafter be referred to as the beam-suspension type, is easy to construct and maintain and lends itself well to many precision applications.

In certain applications of translation systems, and particularly in those in which plane motion of a body is to be controlled from a remote station, it is desirable to use a single steering control to vary the path of the body in the plane. Such a control may operate to adjust the rate of turn of the body as it moves in the plane, thereby causing it to trace the desired path. In the beam type of suspension, however, it has been usual to provide separate controls for effecting changes in the motion of the beam and of the carriage, motion of the body along curved paths being effected only by skillful manipulation of the two control means simultaneously.

In some cases, as when a translation system of the general type herein contemplated is used to suspend a model airplane for motion over an area in a training or demonstration device, it is desirable not only to cause the body, in this instance the airplane, to trace the desired path but also to orient the body in its direction of travel. Furthermore, in such applications, it may be desirable to introduce, in the motion of the body, a component representing for example the effects of a wind of given velocity. Such additional component must add to or subtract from the velocity of the body depending upon the direction of motion of the body in respect to the direction of the additional component.

In view of the above, it is an object of the invention to provide control means for translation systems of the general type mentioned above whereby motion of a body in a plane along any desired path may be produced without the simultaneous use of a multiplicity of controls. Other objects of the invention include provision of means acting continuously to orient the body in the direction of its travel and of means for introducing an additional component in the motion of the body.

The invention provides in one aspect, therefore, in combination with a translation system adapted to produce motion of a body in a plane and provided with plural motor-drive means for moving the body in directions parallel respectively to two mutually perpendicular axes in the plane of motion, a control system having unitary control means for varying the operation of both of the drive motors to produce motion of the body along any desired path in the plane, this system including mechanism for continuously resolving a quantity proportional to the velocity of the body along the desired path into quantities proportional to component velocities parallel, respectively, to the two perpendicular axes, and means utilizing the last-mentioned quantities for control of the drive motors to produce component velocities of the body parallel to each of the axes.

The above and other features of the invention are described below and pointed out in the appended claim.

The single figure of the drawing is a schematic view showing the general arrangement of the control device of the invention as applied to a typical translation system.

A translation system of the type contemplated herein is shown schematically in the drawing and comprises a beam 10, arranged for motion in the direction indicated by XX', and a carriage 12, mounted for movement along beam 10 in the direction indicated by YY' perpendicular to XX'. Motion of beam 10 is effected by motor 14, while that of carriage 12 is effected by motor 16, it being understood that the latter motor is ordinarily mounted on one end of the beam and travels therewith. A body, as for example a model airplane, mounted on carriage 12 may be caused to travel over any desired path in the plane of XX' and YY' by appropriately varying the velocity of the beam in the XX' direction and that of the carriage in the YY' direction.

For ease of control of the beam and carriage velocities, motors 14 and 16 may conveniently be direct-current motors arranged for separate field excitation. Thus, field windings 18 and 20 of motors 14 and 16, respectively, are supplied with excitation from a source of constant direct-current potential indicated at E. Speed and direction of rotation of the motors are then controlled by varying the magnitude and polarity of the excitation in their armature circuits, such variations being produced, for example, by means of separate center-tapped potentiometers which are adjusted simultaneously to control the motion of the body. Such potentiometers effectively control the component velocities of the body in the XX' and YY' directions to produce a resultant velocity of the body in any desired direction. If it is desired to cause motion of the body in response to a single control for adjusting the rate of turn of the body, such information must be translated into motions in the two component directions.

According to the invention, therefore, adjustments of a rate-of-turn control actuate mechanism arranged automatically to resolve a quantity proportional to the desired velocity of the body along its path into quantities proportional respectively to the component velocities in the XX' and YY' directions required to produce the desired velocity of the body.

It is apparent that the rate of turn of the body continuously determines its heading as measured from an arbitrarily chosen reference direction. Since, in the case of the translation system herein contemplated, the two component directions are at right angles, it will appear that the velocity of the body in any direction in the plane may conveniently be resolved into component velocities by multiplying the velocity of the body along its path by the sine and the cosine, respectively, of the heading angle measured from one of the two component directions.

An E. M. F. proportional to the desired velocity of the body in its path is, therefore, applied to each of two center-tapped control potentiometers 22 and 24 associated with the armature circuits of motors 14 and 16, respectively. For this purpose, the two control potentiometers are connected in parallel between one end of the winding of throttle potentiometer 26 and the sliding contactor thereof, this potentiometer being connected, in turn, across a source of constant direct-current potential indicated at $E_1$. Control potentiometers 22 and 24 are provided with sliding contactors 28 and 30, respectively, and the armatures of motors 14 and 16 are connected in each case between the sliding contactor and the center tap of the associated potentiometer.

A consideration of these circuit connections will show that if sliding contactor 28 of potentiometer 22 and sliding contactor 30 of potentiometer 24 are moved along their associated resistance windings in accordance respectively with variations in the sine and the cosine of the heading angle defined above, control E. M. F.'s of the proper magnitude and polarity will be applied to the armatures of motors 14 and 16, thereby to produce the required component velocities of beam 10 and carriage 12.

If desired, the effect on the motion of the body of an independent influence not under the control of the control means may be introduced by adding E. M. F.'s of required magnitude and polarity to those applied to the motors by control potentiometers 22 and 24. Thus, if the body carried by the translation system is a model airplane, the effects upon its motion of a wind of given direction and velocity may be simulated by adding E. M. F.'s proportional to the components to the E. M. F.'s supplied to motors 14 and 16.

While numerous systems have been devised for causing harmonic rectilinear translation of sliding members in response to the variations in an angle, one of the simpler of these involves the use of a crank which may be rotated through the desired angle and a connecting rod between the crank and the member which is constrained to move rectilinearly. Such a device, however, produces translations of the sliding member which are not truly simple harmonic, the deviation from this condition depending upon the effective arm of the crank and the length of the connecting rod.

In the control system of the invention, therefore, an improved crank system is used to produce truly simple harmonic translation of the sliding contactors of the two control potentiometers 22 and 24. This crank system includes three wheels 32, 34 and 36, of equal radii and journaled on parallel axes so positioned that lines drawn from the centers of wheels 34 and 36 to the center of wheel 32 are mutually perpendicular. Conveniently, centers of wheels 34 and 36 are equidistant from that of wheel 32, although this condition is not necessary to the operation of the device.

The three wheels are connected together, as shown in the drawing by means of a sprocket chain indicated schematically at 38. This chain passes over an idler wheel 40 and is arranged to cause clockwise rotations of wheels 34 and 36 in response to counterclockwise rotation of wheel 32 and vice versa. It will be understood, however, that other suitable mechanical arrangements may be used to effect the required relative rotations of the three wheels. Wheel 32 is rotated by turn motor 42. Conveniently, this motor is a direct-current motor having a separately excited field, and is controlled by a rate control arrangement comprising a center-tapped potentiometer 44 connected in its armature circuit and across a source of constant direct-current potential indicated at $E_2$. Adjustment of this potentiometer establishes the speed and direction of motor 42 according to the desired rate of turn. The angular position of wheel 32 then varies as the heading angle, while wheels 34 and 36 turn through the same angle but in the opposite direction.

Crank pins 46, 48 and 50 are mounted on wheels 32, 34 and 36 in such manner that the three are parallel and each crank has the same effective radius. Frames 52 and 54, respectively, supporting potentiometers 22 and 24, are rotatably mounted on cranks 48 and 50 with the sliding axes of the potentiometer contactors mutually perpendicular and intersecting the crank pin axes at right angles. Sliding contactors 28 and 30 of the two potentiometers are connected to crank pin 46 on wheel 32 by means of links 56 and 58 respectively, these links being equal in length to the distances on centers between the respective potentiometer wheels and wheel 32. Guides 60 and 62 on frames 52 and 54, respectively, prevent rotation of the frames relatively to the connecting links.

The various parts are initially assembled as shown in the drawing and it will be understood, therefore, that as the three wheels rotate in response to rotations of motor 42, links 56 and 58 reciprocate contactors 28 and 30, the links at all times remaining parallel to their original positions. Thus, the motion of the two contactors along the resistance windings of the associated potentiometers is truly simple harmonic and, due to the 90° angle between the two sliding paths, one of the contactors moves according to variations in the sine of the angle through which wheel 32 rotates, while the other moves according to variations in the cosine of the same angle.

The E. M. F. proportional to the desired velocity of the body in its path, as determined by throttle potentiometer 26, is thus resolved into control E. M. F.'s for motors 14 and 16 proportional to the required component velocities for beam 10 and carriage 12. Any body mounted on carriage 12 may thus be caused to describe any desired path in the plane of XX' and YY' merely by adjusting the rate of turn control appropriately, the remaining control operations being accomplished entirely automatically by the control system of the invention.

As pointed out above, E. M. F.'s may be added to those ordinarily supplied to motors 14 and 16 by potentiometers 22 and 24 to introduce in the motion of the body components proportional to an external influence. These E. M. F.'s may be applied in proper magnitude and polarity from an independent source, or they may conveniently be introduced by altering the lengths of one or both of links 56 and 58. The latter procedure shifts the base of the harmonically varying E. M. F.'s supplied to the motors by the potentiometers giving the same net effect as the actual addition of independent voltages.

For orienting the body (shown in the drawing as an arrow) in the direction of its travel, a self-synchronous motor 64 is mounted on carriage 12 of the translation system and is arranged to rotate the body about an axis normal to the plane of motion thereof. Self-synchronous motor 64 is controlled by a self-synchronous generator 66 mounted in the same shaft with wheel 32 and driven by turn motor 42. Since the turn motor rotates the shaft through the angle by which the heading is varied, it will appear that the body will be properly oriented in its direction of travel by motor 64. Inasmuch as the orientation system just described operates independently of the previously described means for introducing the effect on the motion of the body of the external influence, it will be seen that, when the system is used to support an airplane model, the crab-wise motion characteristic of an airplane in a cross wind may be simulated perfectly.

Having thus described our invention, what we claim is:

1. In combination with a translation system adapted to produce motion of a body in a plane and provided with plural motor-drive means for moving said body in directions parallel respectively to two mutually perpendicular axes in said plane, a control system having unitary control means for varying the operation of both of said drive motors to produce motion of said body along any desired path in said plane, said control system comprising a center-tapped voltage divider for each drive motor, and connecting control mechanism for continuously delivering a total voltage proportional to the desired velocity of the body along the desired path, said individual voltages being maintained proportional to the component velocities parallel respectively to said perpendicular axes, for controlling said drive motors to produce corresponding component velocities of said body parallel to each of said axes.

2. In combination with a translation system adapted to produce motion of a body in a plane and provided with plural motor-drive means for moving said body in directions parallel respectively to two mutually perpendicular axes in said plane, a control system having unitary control means for varying the operation of both of said drive motors to produce motion of said body along any desired path in said plane, said control system comprising a center-tapped voltage divider for each drive motor, and simple harmonic connecting control mechanism for continuously delivering a total voltage proportional to the desired velocity of the body along the desired path, said individual voltages being maintained proportional to the component velocities parallel respectively to said perpendicular axes, for controlling said drive motors to produce corresponding component velocities of said body parallel to each of said axis.

OTTO H. SCHMITT.
WILLIAM B. GREENLEE.

References Cited in the file of this patent
UNITED STATES PATENTS

| Number | Name | Date |
|---|---|---|
| 723,786 | Schramm | Mar. 24, 1903 |
| 2,164,412 | Koster | July 4, 1939 |
| 2,332,523 | Norden et al. | Oct. 26, 1943 |